United States Patent
Chelette et al.

(10) Patent No.: US 10,436,357 B2
(45) Date of Patent: Oct. 8, 2019

(54) CONNECTING OIL COUNTRY TUBULAR GOODS

(71) Applicant: United States Steel Corporation, Pittsburgh, PA (US)

(72) Inventors: Kenneth Darrel Chelette, Houston, TX (US); Wei Tang, Katy, TX (US)

(73) Assignee: United States Steel Corporation, Pittsburgh, PA (US)

( * ) Notice: Subject to any disclaimer, the term of this patent is extended or adjusted under 35 U.S.C. 154(b) by 148 days.

(21) Appl. No.: 15/472,333

(22) Filed: Mar. 29, 2017

(65) Prior Publication Data

US 2017/0198839 A1    Jul. 13, 2017

Related U.S. Application Data

(63) Continuation of application No. 14/536,828, filed on Nov. 10, 2014, now abandoned, which is a continuation of application No. 13/242,922, filed on Sep. 23, 2011, now Pat. No. 8,882,157.

(60) Provisional application No. 61/386,614, filed on Sep. 27, 2010.

(51) Int. Cl.
*F16L 15/00* (2006.01)
*F16L 15/06* (2006.01)
*E21B 17/10* (2006.01)

(52) U.S. Cl.
CPC ........ *F16L 15/002* (2013.01); *E21B 17/1042* (2013.01); *F16L 15/001* (2013.01); *F16L 15/004* (2013.01); *F16L 15/06* (2013.01)

(58) Field of Classification Search
CPC .......... F16L 15/002; F16L 15/06; F16L 15/08
USPC .................................................. 285/333, 334
See application file for complete search history.

(56) References Cited

U.S. PATENT DOCUMENTS

| | | | | |
|---|---|---|---|---|
| 1,781,091 A | * | 11/1930 | Wilson | E21B 17/046 285/333 |
| 3,854,760 A | * | 12/1974 | Duret | E21B 17/042 285/334 |
| 4,026,583 A | * | 5/1977 | Gottlieb | B23K 20/085 285/334 |
| 4,161,332 A | * | 7/1979 | Blose | F16L 15/007 285/334 |
| 4,373,750 A | * | 2/1983 | Mantelle | F16L 15/003 285/334 |
| 4,676,529 A | * | 6/1987 | McDonald | F16L 15/007 285/334 |

(Continued)

*Primary Examiner* — David Bochna
(74) *Attorney, Agent, or Firm* — Michael D. Lazzara; Leech Tishman Fuscaldo & Lampl

(57) ABSTRACT

Ends of separate tubular members used in oil and gas drilling are connected pin-to-pin by a threaded coupling and made leak tight by an internal pressure seal, wherein the male or field end pin of a first tubular member has an integral geometry designed to mate with the female or mill end pin of a second tubular member. The coupling and tubular members possess a modified buttress thread form having a negative load flank angle and a positive stab flank angle. When assembled, the coupling connects the field end pin of the first tubular member with the mill end pin of the second tubular member, wherein integral geometries of the mated pin ends generate the interference necessary to produce a single, metal-to-metal, leak-tight, internal contact pressure seal.

6 Claims, 8 Drawing Sheets

(56) References Cited

U.S. PATENT DOCUMENTS

| | | | | |
|---|---|---|---|---|
| 4,688,832 A * | 8/1987 | Ortloff | F16L 15/004 | 285/334 |
| 4,705,307 A * | 11/1987 | Chelette | F16L 15/007 | 285/334 |
| 4,728,129 A * | 3/1988 | Morris | F16L 15/007 | 285/334 |
| 4,752,344 A * | 6/1988 | Jubb | H01F 41/18 | 148/310 |
| 4,732,344 A | 8/1988 | Perkins et al. | | |
| 4,988,127 A * | 1/1991 | Cartensen | E21B 17/042 | 285/334 |
| 5,415,442 A * | 5/1995 | Klementich | E21B 17/0423 | 285/334 |
| 5,462,315 A * | 10/1995 | Klementich | E21B 17/0423 | 285/334 |
| 5,474,334 A * | 12/1995 | Eppink | E21B 7/067 | 285/333 |
| 5,687,999 A * | 11/1997 | Lancry | E21B 17/0423 | 285/334 |
| 5,769,466 A * | 6/1998 | Noel | E21B 17/042 | 285/334 |
| 5,794,985 A * | 8/1998 | Mallis | E21B 17/042 | 285/334 |
| 5,829,797 A * | 11/1998 | Yamamoto | E21B 17/042 | 285/333 |
| 6,347,814 B1 * | 2/2002 | Cerruti | F16L 15/002 | 285/334 |
| 6,454,315 B1 * | 9/2002 | Yamaguchi | F16L 15/001 | 285/334 |
| 6,581,980 B1 * | 6/2003 | DeLange | F16L 15/004 | 285/334 |
| 6,857,668 B2 * | 2/2005 | Otten | F16L 15/004 | 285/334 |
| 7,478,842 B2 * | 1/2009 | Reynolds, Jr. | F16L 15/004 | 285/333 |
| 7,585,002 B2 * | 9/2009 | Curley | F16L 15/007 | 285/333 |
| 7,753,416 B2 * | 7/2010 | Mazzaferro | F16L 15/006 | 285/333 |
| 7,900,975 B2 * | 3/2011 | Nakamura | F16L 15/004 | 285/334 |
| 8,186,722 B2 * | 5/2012 | Carcagno | F16L 15/001 | 285/333 |
| 8,246,086 B2 * | 8/2012 | Watts | F16L 15/002 | 285/334 |
| 8,882,157 B2 * | 11/2014 | Chelette | F16L 15/002 | 285/334 |
| 2004/0021314 A1 * | 2/2004 | Pina | F16L 15/004 | 285/334 |
| 2008/0296894 A1 * | 12/2008 | Bailey | F16L 15/002 | 285/334 |
| 2012/0074692 A1 | 3/2012 | Chelette et al. | | |

\* cited by examiner

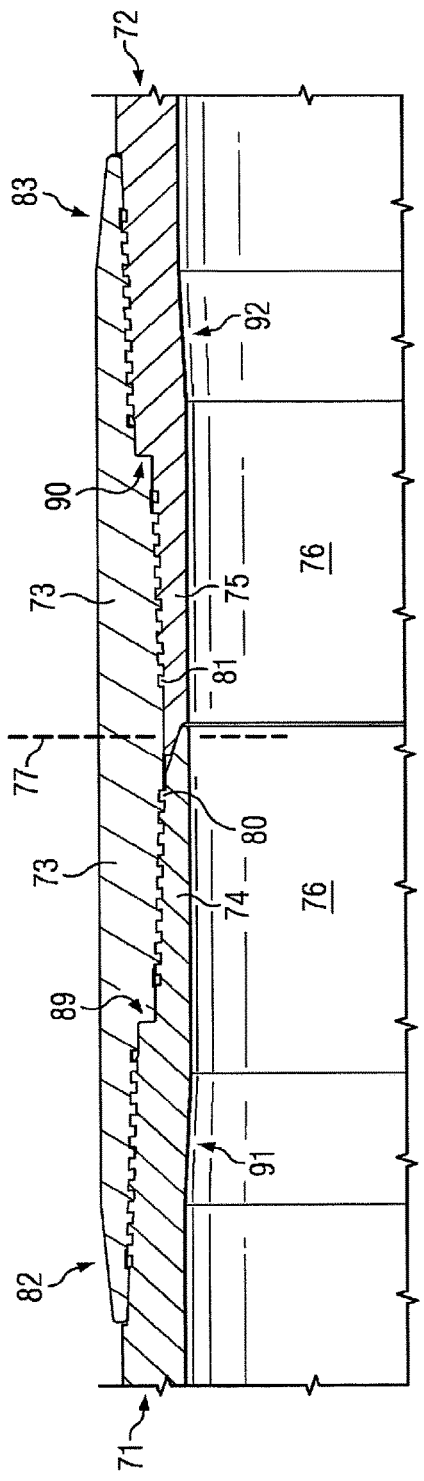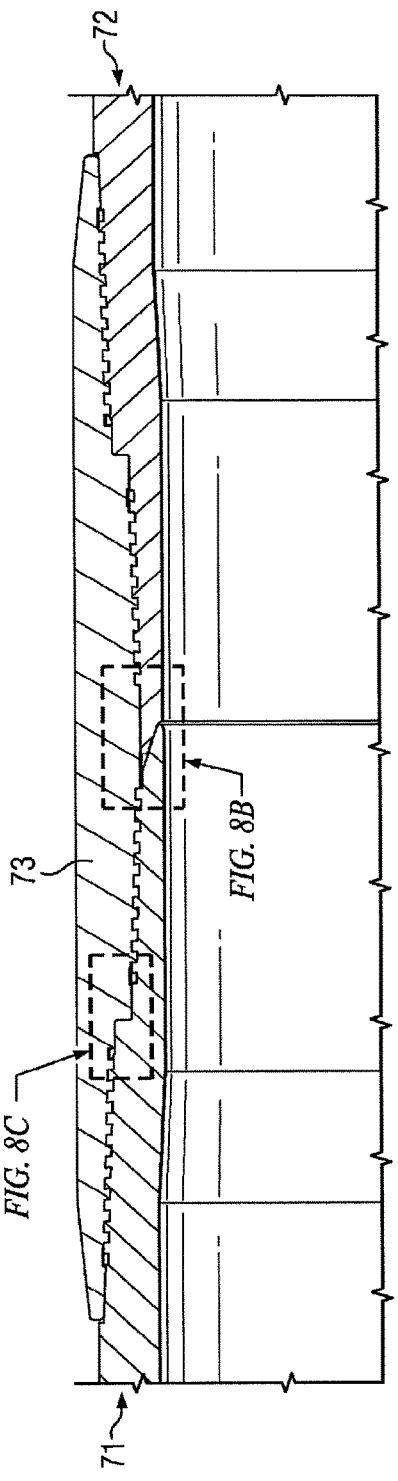

CONNECTING OIL COUNTRY TUBULAR GOODS

CROSS-REFERENCE TO RELATED APPLICATIONS

The present application is a continuation application of U.S. patent application Ser. No. 14/536,828 filed Nov. 10, 2014 which is a continuation of U.S. patent application Ser. No. 13/242,922 filed Sep. 23, 2011, now U.S. Pat. No. 8,882,157, issued on Nov. 11, 2014, which incorporates in its entirety and claims the full benefit of U.S. Provisional Application Ser. No. 61/386,614 entitled "Threaded Connection and Seal for Oil Country Tubular Goods," filed on Sep. 27, 2010, now abandoned. The disclosures of all the foregoing applications are hereby incorporated by reference in their entirety into the present application.

TECHNICAL FIELD

The present invention relates to the coupling and sealing of strings of tubular members commonly used in oil and gas drilling.

BACKGROUND OF THE INVENTION

Oil and gas wells and other types of wells such as geothermal wells are typically drilled from the well surface to a desired downhole location using a rotary drilling rig, drill pipe, and drill bits. The drill hole or wellbore for conveying subsurface oil, gas, or other formation fluids are typically drilled in stages. For example, a wellbore may be first drilled with a column of drill pipe (a drill string) and a first drill bit having a particular diameter. At a desired depth for a first portion of the wellbore, the drill string and drill bit are removed from the wellbore. Tubular members of smaller diameter, often referred to as casing or a casing string, may then be placed in the first portion of the wellbore. An annulus formed between the inside diameter of the wellbore and the outside diameter of the casing string is generally filled with cement. The cement provides support for the casing, isolates downhole formations or subterranean strata from each other, and prevents contaminating fluids from entering the well.

Often, the next step in drilling the wellbore is to pass the drill string having a second smaller diameter drill bit through the first casing string and drill another portion of the wellbore to a selected depth beyond the depth of the first casing string, and a second casing string is installed. Many wells have two or more casing strings with different inside diameters installed in a telescoping manner from the well surface to a desired downhole location. For example, a first casing string may be installed from the well surface to a depth of 500 to 1,000 feet. The first casing string may have an outside diameter of nine and five/eighths inches (9 ⅝"). A second casing string may be installed extending from the surface to the desired depth or from proximate the downhole end of the first casing string to a desired depth of 9,000 or 10,000 feet. The second casing string may have an outside diameter of approximately seven inches (7"). This sequence of drilling wellbores and installing casing strings may be repeated as many times as necessary, with smaller and smaller components until the ultimate desired depth or downhole location of the wellbore has been achieved.

In recent years, "premium" (i.e., proprietary) connections have been designed specifically to overcome the challenges encountered with extended reach drilling operations, as well as the horizontal drilling needed for the recovery of shale gas by hydraulic fracturing ("fracking") of gas-bearing shale formations. Premium connections can withstand higher drilling pressures and temperatures than standard American Petroleum Institute (API) connections of the prior art. Premium connections also have consistent make-up parameters due to the tight manufacturing tolerances, and possess higher tensile and compressive strengths and burst and collapse ratings than demonstrated by standard API connections of the prior art. Although premium connections are generally more leak resistant than standard API connections, the typical premium coupled connection nonetheless has two potential leak paths associated with the two separate ends of the coupled pins. The present invention solves the problem of two potential leak paths by machining two different integral seal geometries on separate pin ends of mated tubular members which come into contact on assembly to create a single, metal-to-metal, leak-tight, internal seal.

SUMMARY OF THE INVENTION

In accordance with the teachings of the particular embodiments of the present invention, separate tubular members are connected pin-to-pin by a threaded coupling and made leak-tight by an internal pressure seal. The nose of the field end pin (male pin) of a first tubular member is machined to have an integral geometry comprising a conical shoulder designed to mate with the nose of mill end pin (female pin) of a second tubular member, wherein the nose of the mill end pin of the second tubular member is machined to have a lipped shoulder. The present invention uses a modified buttress thread form having a negative (hooked) load flank angle and a positive stab flank angle. When properly made up, the coupling connects and mates the first tubular member (the field end) with the second tubular member (the mill end), wherein the interference generated by the integral geometries of the mated pin ends creates a single, metal-to-metal, leak-tight, internal pressure seal.

The particular embodiments of the present invention (i) provide improved performance over the tensile and compressive load carrying capabilities of prior art connections, (ii) provide an external pressure seal to prevent the influx of well bore fluids and pressure to the thread region, and (iii) maintain greater contact load on the internal seal and shoulder geometry during tension loading. Thread interference of the present invention is generated by both axial and radial contact.

An additional benefit of the present invention is that the coupling can be produced from standard API coupling stock or from minimally heavy-walled mill tubing. Therefore, special heavy-walled coupling stock is not required. Also, with one embodiment of the present invention, the pin ends of the tubular members can be machined on plain end pipe that doesn't require forming since upsetting at the pin ends is not an essential feature of that embodiment.

Other features and advantages of the present invention will be apparent from the detailed description of the preferred embodiments, taken in conjunction with the accompanying drawings which illustrate, by way of example, the principles of the invention.

BRIEF DESCRIPTION OF THE DRAWINGS

A more complete and thorough understanding of the present embodiments and advantages thereof may be acquired by referring to the following description taken in conjunction with the accompanying drawings, which are given by way of illustration only, and are in no way intended to limit the invention.

FIG. 7 is a schematic drawing in section with portions broken away illustrating one embodiment of the present invention showing an alternate geometric profile of the field end of a first threaded tubular member releasably engaging the mill end of a second threaded tubular member, a coupling, and a torque shoulder situated along the thread path of each tubular member.

FIG. 8A is a schematic drawing in section with portions broken away of FIG. 7 showing a first detailed area labeled FIG. 8B and a second detailed area labeled FIG. 8C.

DETAILED DESCRIPTION OF THE INVENTION

The term "oil country tubular goods" and "OCTG" are used in this application to include casing, tubing, pup joints, couplings and any other type of pipe or tubular member associated with drilling, producing or servicing oil wells, natural gas wells, geothermal wells or any other subsurface wellbore. A wide variety of tubular members and oil country tubular goods (OCTG) may be releasably engaged with each other by threaded connections formed in accordance with teachings of the present invention.

Figure 1:
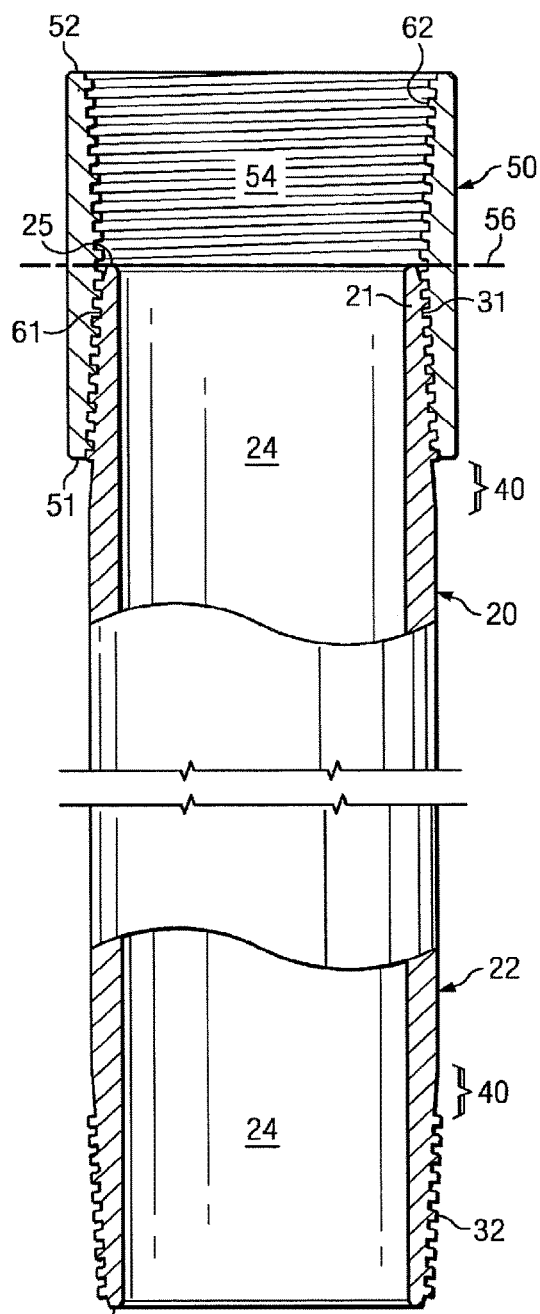
FIG. 1 is a schematic drawing in section with portions broken away of an exemplary prior art tubular member and coupling releasably engaged with each other.
Figure 2:
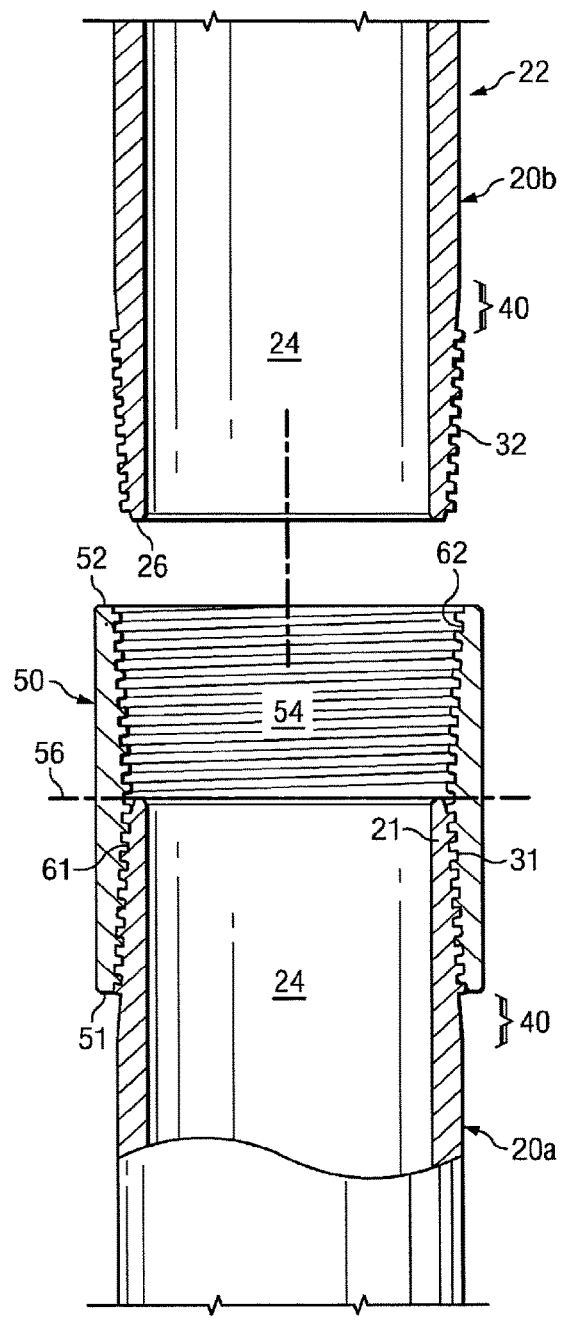
FIG. 2 is a schematic drawing in section with portions broken away of an exemplary prior art connection showing a first tubular member and a coupling releasably engaged with each other and a second tubular member having a threaded pin end.
Figure 3:
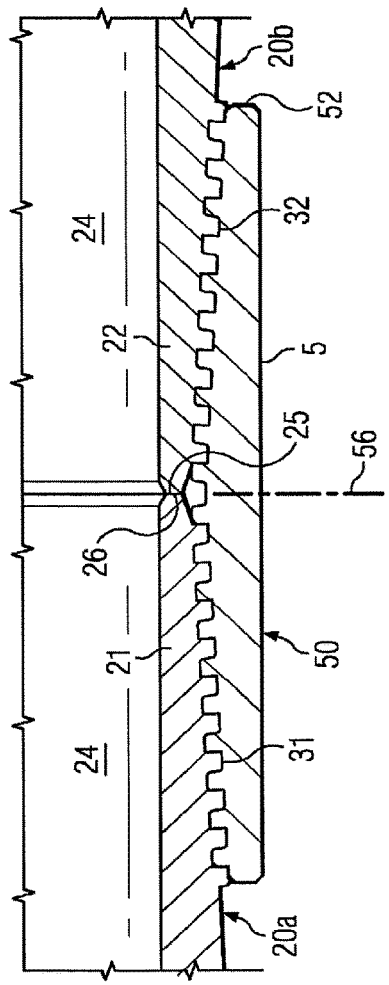
FIG. 3 is a schematic drawing in section with portions broken away of an exemplary prior art connection showing the mill end of a first tubular member, the field end of a second tubular member, and a threaded coupling connecting the first tubular member with the second tubular member.

Various aspects of the present invention will be described in relation to prior art tubular members 20 and couplings 50 as shown in FIG. 1. To describe some features of the prior art, tubular members 20 may sometimes be designated as 20a and 20b, as shown in FIGS. 2 and 3. For some applications, prior art tubular members 20 may be sections of a casing string used to both drill and complete a wellbore (not expressly shown). For such applications, each tubular member 20 may have substantially the same overall dimensions and configurations as associated with a conventional oil field casing string. For other applications, one or more tubular members (not expressly shown) with dimensions and configurations associated with a bottom hole assembly (not expressly shown) used to drill oil and gas wells may have threaded portions corresponding with tubular members 20. Also, one or more tubular members 20 may have a configuration and dimensions associated with liner hangers (not expressly shown) or other components used to complete oil and gas wells.

FIG. 1 shows prior art tubular member 20. For this embodiment, tubular member 20 may be generally described as an elongated, hollow section of casing. Tubular member 20 includes first end 21 and second end 22 with longitudinal bore 24 extending therethrough. Respective thread profiles 31 and 32 are preferably formed on respective first end 21 and second end 22 of tubular member 20. First end 21 and second end 22, each with an external male thread profile, may sometimes be referred to as "pin ends". As discussed later in more detail, portions of first thread profile 31 and second thread profile 32 may generally correspond with standard API buttress threads for oil country tubular goods. API Specification Standard 5B contains detailed information for casing threads.

First end or pin end 21 of prior art tubular member 20 may be described as the "mill end." Second end or pin end 22 may be described as the "field end." The relationship between mill end 21, field end 22, and coupling 50 are shown in FIGS. 1, 2 and 3. Various features associated with external thread profiles 31 and 32 will be described with respect to center plane 56 of associated coupling 50.

Prior art coupling 50, as shown in FIG. 1, may have the same overall dimensions and configuration associated with standard API couplings for oil country tubular goods. Coupling 50 may be described as a relatively short section of pipe defined in part by first end 51 and second end 52, with longitudinal bore 54 extending therebetween. Matching internal female thread profiles 61 and 62 may be formed within longitudinal bore 54 extending respectively from first end 51 and second end 52, with each end sometimes referred to as a "box" or "box end." Center plane 56 defines approximately the middle of coupling 50 where internal thread profiles 61 and 62 meet. For some applications, thread profiles 61 and 62 may be standard API buttress threads for oil country tubular goods as described in API Specification Standard 5B.

Tubular member 20 with coupling 50 attached thereto in accordance with the teachings of U.S. Pat. No. 6,817,633 is shown in FIGS. 1-3. For some applications, tubular member 20 may be initially foamed with blank ends (not expressly shown). Respective thread profiles 31 and 32 may then be formed on first pin end 21 and second pin end 22 using conventional pipe threading machines and equipment (not expressly shown). During the manufacturing process associated with forming thread profiles 31 and 32, coupling may be releasably engaged with first pin end 21. Tubular member 20 will then be shipped from the manufacturing facility with coupling 50 releasably engaged with first pin end 21. Therefore, first pin end 21 with coupling 50 attached thereto may sometimes be referred to as the "factory end" or "mill end."

Various types of powered tools and equipment (not expressly shown) may be satisfactorily used to releasably engage coupling 50 with first thread profile 31 of pin end 21. As previously noted, prior art coupling 50 preferably has matching internal thread profiles 61 and 62. Therefore, either first end 51 or second end 52 of coupling 50 may be releasably engaged with first pin end 21. For purposes of describing various features of the present invention, the process of making up or releasably engaging coupling 50 with first pin end 21 will be described with respect to end of coupling 51. In a similar manner, releasable engagement of second pin end 22 with coupling 50 will be described with respect to second end of coupling 52. However, first pin end 21 may be satisfactorily engaged with second end 52 of coupling 50 and second pin end 22 may be satisfactorily engaged with first end 51 of coupling 50.

FIG. 2 shows a typical orientation of first tubular member 20a and second tubular member 20b prior to making up the tubular members on a typical drilling platform (not expressly shown). Multiple tubular members 20 may be releasably engaged with each other to form a casing string for drilling and completing a wellbore (not expressly shown). Generally, first tubular member 20a will be positioned by the drilling platform over a wellbore with second end or box end 52 looking up to receive second pin end or field end 22 of second tubular member 20b. Various types of pipe tongs and other equipment associated with making and breaking threaded connections between oil country tubular goods may be satisfactorily used to releasably engage second pin end 22 of second tubular member 20b with second end or box end 52 of coupling 50.

With prior art connections exemplified by U.S. Pat. No. 6,817,633 and illustrated by FIG. 3, coupling 50 serves primarily as a mechanical means of joining tubular members 20a and 20b at their respective pin ends 21 and 22. This pin-to-pin contact occurs at center plane 56 when the connection is fully made up. However, with this particular geometry, the pin ends simply abut each other with less-than optimal sealing capacity. Consequently, the connection has the potential for two separate leak paths. In contrast, the particular embodiments of the present invention are designed to optimize sealing capabilities, such that when separate tubular members are joined by the coupling and fully made up, the coupling and the pin ends are designed to work together to generate the interference needed to create an internal, metal-to-metal, leak-tight contact pressure seal. During the past several years, oil and gas wells have routinely been drilled to much greater depths and/or longer lengths than in previous years. Also, wellbore geometries have become much more complex including highly deviated, horizontal, multilateral, short-radius and extended reach wellbores to tap oil and gas reservoirs from deeper downhole locations and more remotely located geological formations. Accordingly, the present invention is specifically designed to overcome the challenging drilling conditions encountered with extended reach drilling operations, such as the horizontal drilling needed for the recovery of shale gas by hydraulic "fracking" of gas-bearing shale formations.

Figure 4:
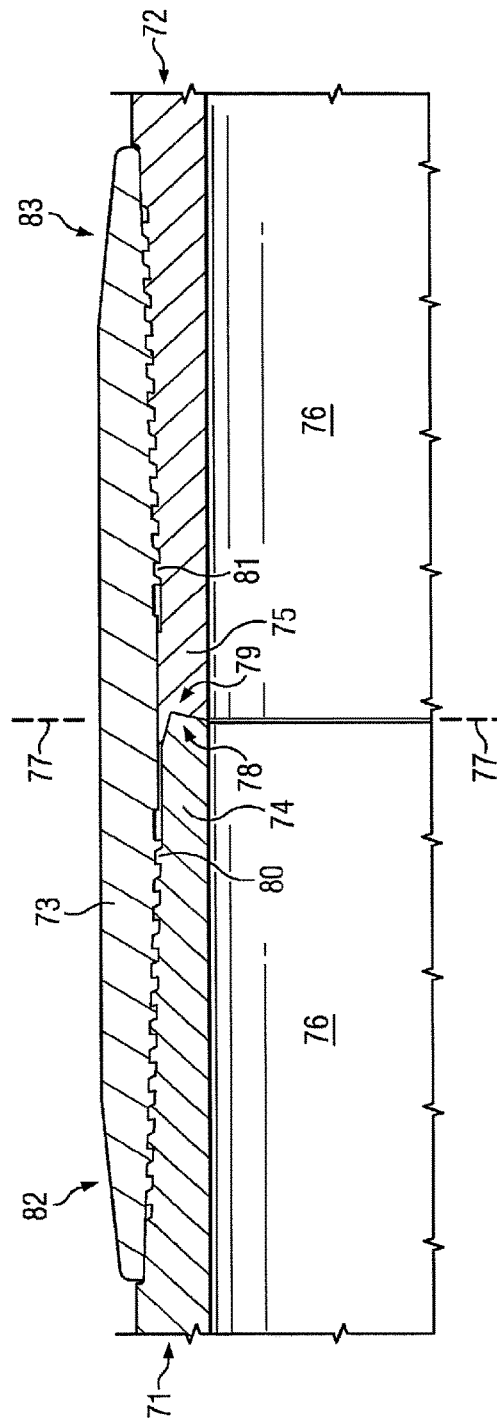
FIG. 4 is a schematic drawing in section with portions broken away showing the field end of a first tubular member, the mill end of a second tubular member, and a threaded coupling connecting the first tubular member with the second tubular member according to the teachings of one embodiment of the present invention.

FIG. 4 shows one embodiment of the present invention. First tubular member 71 and second tubular member 72, shown in section with portions broken away, are releasably connected to each other by threaded coupling 73 which is oriented along the longitudinal axis (center line) 76 of tubular members 71 and 72. Coupling 73 has a thread profile that mates with the thread profiles of tubular members 71 and 72. Thread profiles are exemplified by threads 80 and 81 of tubular members 71 and 72, respectively. Center plane 77 defines approximately the middle of coupling 73 where tubular members 71 and 72 meet.

FIG. 4 also shows the power-tight position for releasably connecting first tubular member 71 and second tubular member 72 with coupling 73 of the present invention. In the power-tight position, the shoulder 78 of the field end 74 of first tubular member 71 and the shoulder 79 of the mill end 75 of second tubular member 72 are in direct contact with each other at the center plane 77 of coupling 73. This contact between shoulders 78 and 79 creates an adjoining or abutting radial torque shoulder located at approximately the center plane 77 of coupling 73. Direct contact between shoulders 78 and 79 ensures that all forces exerted during power tight assembly will be transmitted against adjacent tubular members 71 and 72 and the coupling 73. The coupling 73 has a "near flush" outer diameter which is limited to no greater than 6.5% of the outer diameters of tubular members 71 and 72. The coupling 73 also has beveled ends 82 and 83. The near flush design and the beveling aid in running a string of tubular members down a borehole. The beveling also aids in pressure energization of the external pressure seal created by the coupling 73, as well improves the thread load distribution along the threaded length of the connection.

Figure 5A:
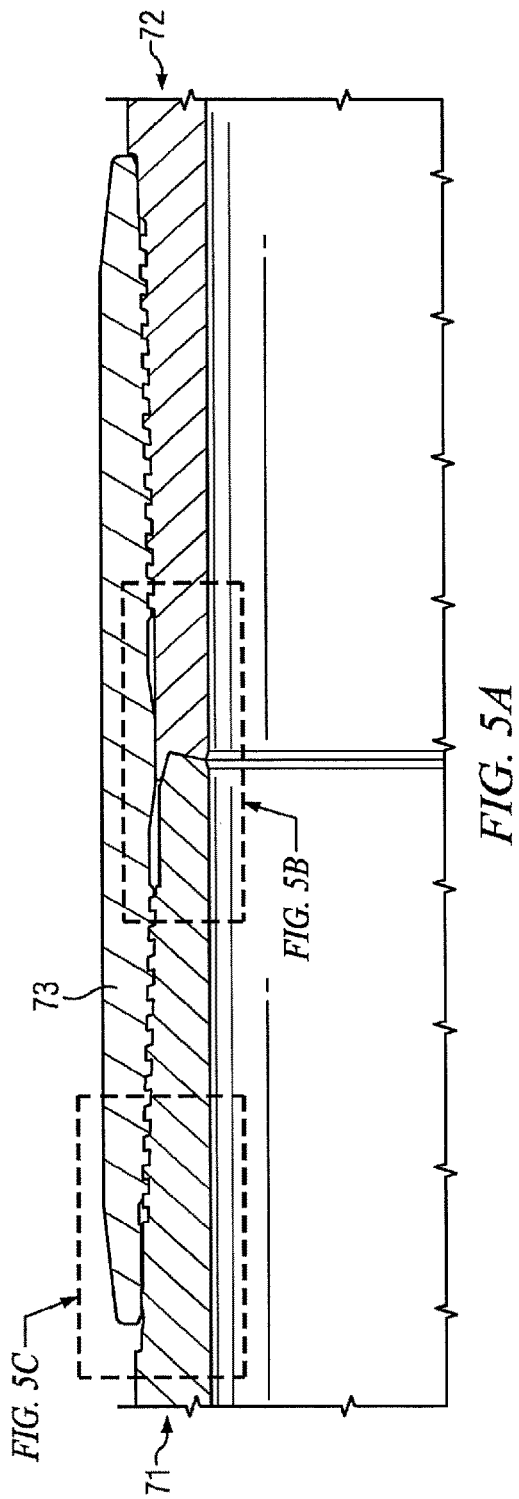
FIG. 5A is a schematic drawing in section with portions broken away of FIG. 4 showing a first detailed area labeled FIG. 5B and a second detailed area labeled FIG. 5C.
Figure 5B:
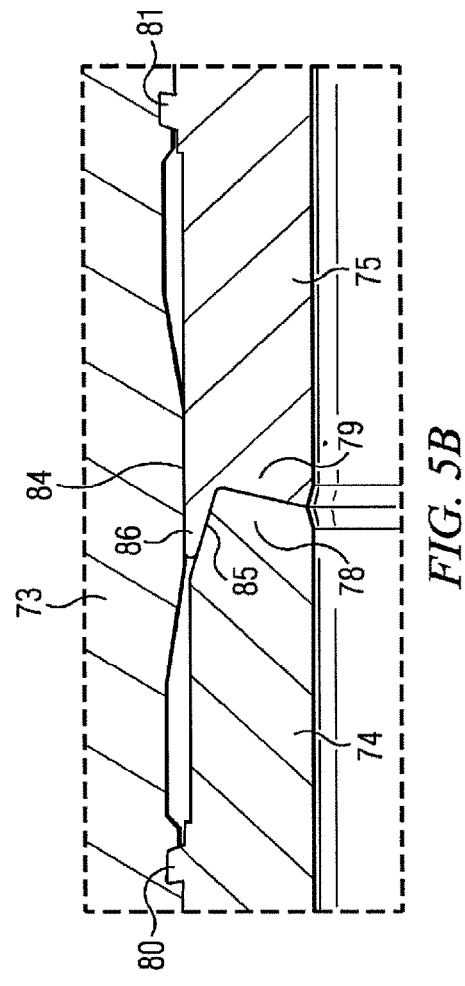
FIG. 5B is a schematic drawing in section of the first detailed area of FIG. 5A showing the geometric profile of a coupling facilitating an internal contact pressure seal by causing the field end of a first tubular member to releasably engage the mill end of a second tubular member according to the teachings of one embodiment of the present invention.

In accordance with the teachings of the particular embodiments of the present invention, the field end 74 of first tubular member 71 and the mill end 75 of second tubular member 72 are connected pin-to-pin at their respective shoulders 78 and 79 by threaded coupling 73. The problem of two separate leak paths associated with two separate pin ends in a conventional coupling configuration of the prior art is solved with the present invention by an integral seal geometry that provides a single, leak-tight, metal-to-metal, internal pressure seal. With prior art coupled connections, two separate geometries exist at each pin end resulting in two potential leak paths. In contrast, the particular embodiments of the present invention incorporate a single, metal-to-metal seal geometry and, therefore, allows for only a single potential leak path through the connection. As shown in FIGS. 5A and 5B, the field end 74 of first tubular member 71 is machined to create a conical shoulder 78 which is designed to engagingly mate with a correspondingly machined lipped shoulder 79 of the mill end 75 of second tubular member 72. The conical shoulder has a vertically oriented face that abuts a corresponding vertically oriented face of the lipped shoulder when the tubular members are coupled, with each respective face being oriented at an angle ranging from a perfectly vertical 0 degrees to a slant of 20 degrees relative to a plane perpendicular to the longitudinal axis 76, with a preferred slant being 15 degrees.

The conical shoulder 78 of the field end pin 74 is machined to have a primary seal surface 85, as shown in FIG. 5B. The primary seal surface is designed to make contact with a corresponding seal surface on the lipped shoulder 79 of the mill end pin 75. The primary seal surface has an angle of less than 35 degrees and greater than 1.5 degrees relative to the longitudinal axis 76 (not shown) of tubular members 71 and 72. Specifically, lipped shoulder 79 has a lip 86 that possesses a surface designed to create an area of metal-to-metal interference at the primary seal surface 85 of the conical shoulder 78. The seal surface of lip 86 is machined at an angle slightly steeper than the primary seal surface 85 which allows the lip 86 to elastically deflect. The elastic deflection is radial and is limited by a closely toleranced coupling center surface 84. Thus, the metal-to-metal interference is designed to create pressure energization of the integral seal and is controlled by close tolerancing of the mated seal surfaces and the appropriate seal diameters. The mating of the seal surfaces creates a contact pressure that is initially a function of the juxtaposition of the diameters of the seal surfaces. During the energization process, the lip 86 deflects and contacts the coupling center surface 84 before final seal assembly occurs. This contact later in the same assembly process re-enforces the lip 86, adding rigidity to the lip 86 and increasing the seal surface contact pressure significantly more than would occur if contact were not made with the coupling center surface 84. The respective angles and surfaces of the mated shoulders provide the integral geometries needed to generate interference sufficient to produce a single, metal-to-metal, leak-tight, internal contact pressure seal.

Figure 5C:
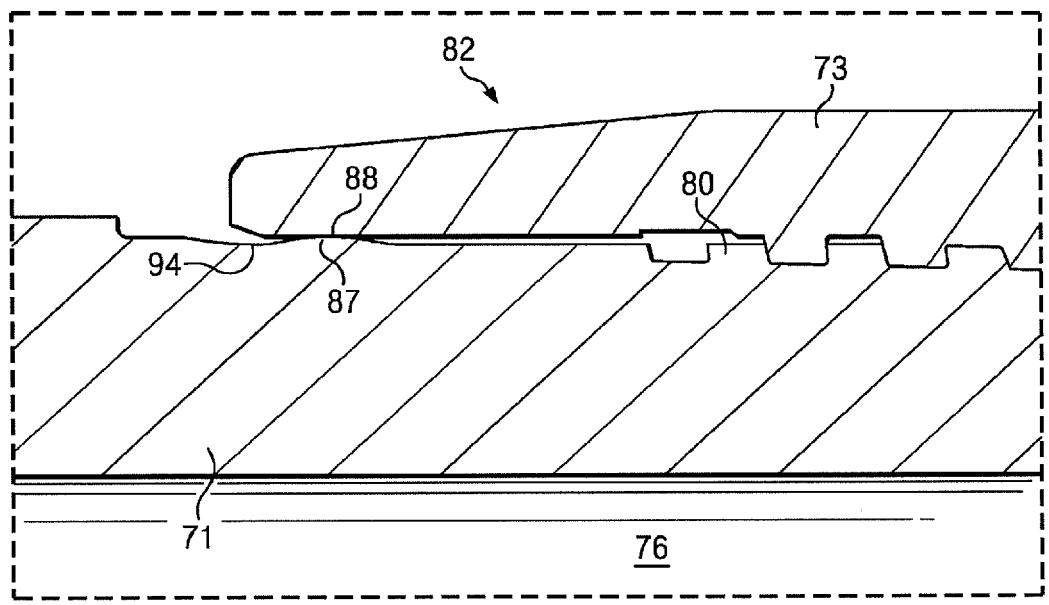
FIG. 5C is a schematic drawing in section of the second detailed area of FIG. 5A showing the geometric profile of an external contact pressure seal created by the end portion of a coupling releasably engaging the field end of a tubular member according to the teachings of one embodiment of the present invention.

The geometries of coupling 73 and tubular members 71 and 72 are designed such that they also create an external contact pressure seal in the vicinity of beveled ends 82 and 83, which is in addition to the internal contact pressure seal at the interface of coupling center surface 84, primary seal surface 85, and lip 86. Specifically, each end of tubular members 71 and 72 possesses a spherical seal surface as illustrated by 87 in FIG. 5C. The spherical seal surface is oriented along the longitudinal axis 76 and near the outer diameter of the respective tubular member. The spherical seal surface 87 is produced by machining each end of the tubular member to create a spherical area which provides the respective tubular member with a radius of between 0.8 and 2.0 inches at the location of the spherical seal surface. An additional curved surface 94 is machined to provide a gradual blend of the spherical surface to the machined surface at the distal end of the machined surfaces of field end pin 74 and mill end pin 75. This blended surface provides a reduction in peak stresses due to applied loads. The spherical seal surface 87 is designed to effect interference with a corresponding cylindrical surface as illustrated by 88 in FIG. 5C. A cylindrical surface 88 lies at each beveled end 82 and 83 of the coupling 73. Each cylindrical seal surface 88 at each beveled end of coupling 73 is referred to as the coupling counter-bore and is oriented parallel to longitudinal axis 76. This seal surface geometry is sometime referred to as a "ball and cylinder," whereby the "ball" is created by placing a radius near the end of the thread profile of the tubular member and the "cylinder" is the counter-bore diameter of the coupling. Seal interference is created by the difference in diameter between the apex of the "ball" radius and the counter-bore ("cylinder") diameter. The interface of spherical seal surface 87 and cylindrical seal surface 88, when used in combination with the internal pressure seal at the pin ends, provides additional sealing capacity when coupling 73 and tubular members 71 and 72 are properly made up.

Figure 6:
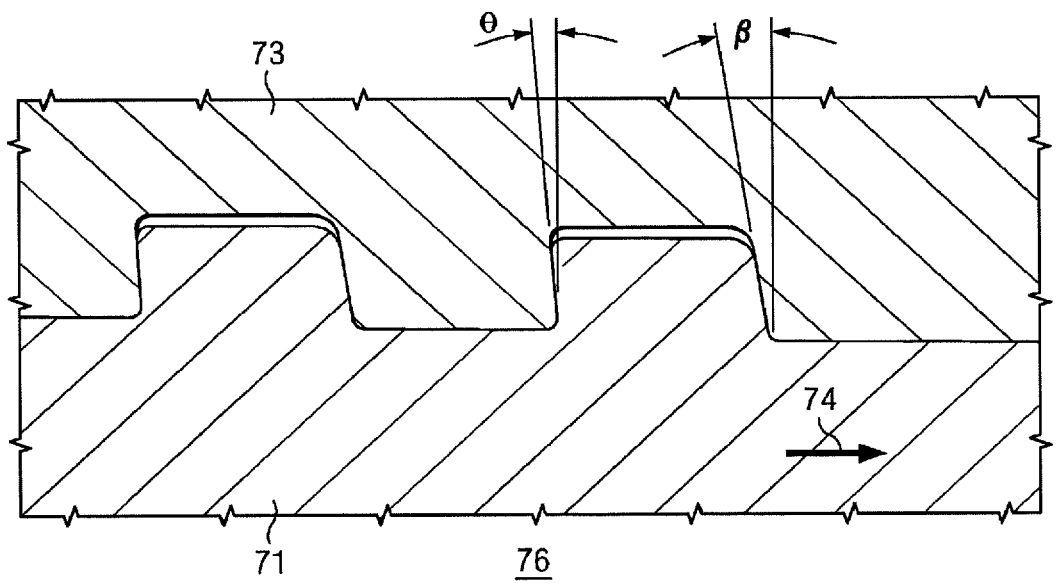
FIG. 6 is a schematic drawing in section showing a detail of a modified buttress thread form according to the teachings of the various embodiments of the present invention.

The thread form of the coupling 73 and tubular members 71 and 72 is a tapered, modified buttress thread ranging from 3 to 8 pitch. FIG. 6 (angles not necessarily drawn to relative scale) illustrates the modified buttress thread form having negative (hooked) load flanks and positive stab flanks. The stab flanks, which are the forward or leading thread surfaces relative to pin end 74, create on each thread a positive, open face angled within a range of +10 degrees and +20 degrees (represented by β), the angle being measured counterclockwise relative to an axis perpendicular to longitudinal axis 76. The load flanks, which are the trailing thread surfaces relative to pin end 74, create on each thread a negative or hooked, undercut face angled within a range of −3 degrees and −10 degrees (represented by theta), the angle being measured counterclockwise relative to an axis perpendicular to the longitudinal axis 76. The hooked thread form is designed to generate thread interference by both axial and radial contact at assembly of the connection. The pitch diameters are established relative to a pitch line which extends through the mill end and field end threads at a specified location relative to the thread height.

During assembly of the connection, the thread crests of the coupling initially contact the thread roots of each pin. With continued rotation up to the point of contact with torque shoulders 89 and 90, the thread interference continues to increase until the stab, load, and root flanks of each pin thread form are in intimate contact with the corresponding mating flanks of the coupling thread form, while the pin thread crests and the coupling thread roots are in clearance with each other. Axial interference is created when the load and stab flanks of the mated pin and coupling thread forms are squeezed along the pitch line due to the coupling thread width along the pitch line being greater than the pin thread gap width. When properly made up, coupling 73 connects the field end 74 of first tubular member 71 with the mill end 75 of second tubular member 72. The modified thread form provides improved perfomance of the tensile and compressive load carrying capacity of the connection and also maintains greater contact load on the seal and shoulder geometry during tension loading. The connection coupling can be produced from minimally heavy-walled mill tubing, thus not requiring special heavy-walled coupling stock.

Figure 8B:
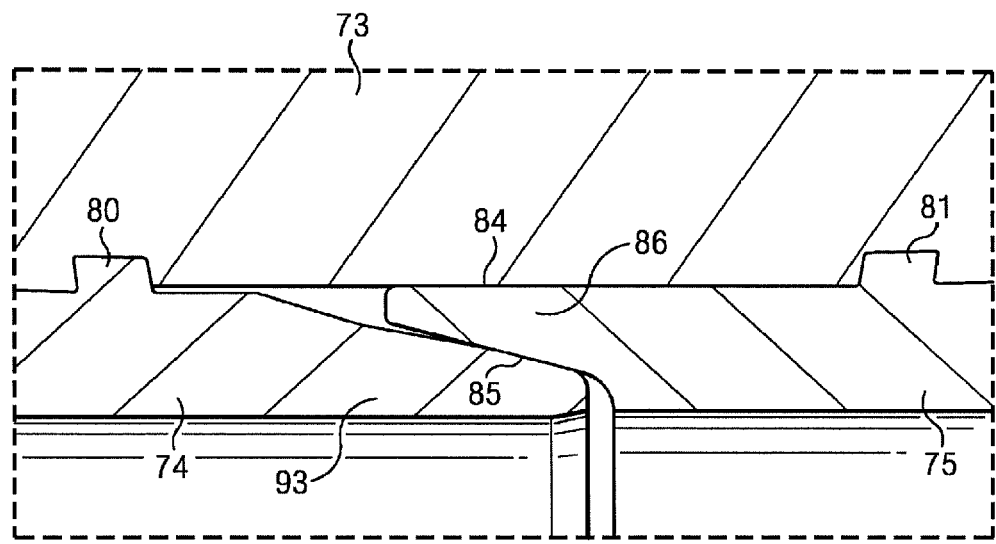
FIG. 8B is a schematic drawing in section of the first detailed area of FIG. 8A illustrating one embodiment of the present invention showing an alternative geometric profile of the field end of a first threaded tubular member releasably engaging the mill end of a second threaded tubular member by means of a coupling.

In the embodiment of the present invention shown in FIG. 7, tubular members 71 and 72 are cold-formed so that the inner diameter of the terminal 3 to 4 inches of each pin end of each respective tubular member is swaged down, as indicated by 91 and 92. The amount of swaging is approximately 2% to 6.5% of the outer diameter of the tubular member. Also, as shown in FIG. 8B, field end pin 74 of tubular member 71 is machined to create a conical surface 93 (creating a male sealing surface) which is designed to engagingly mate with a correspondingly machined lip 86 (creating a female sealing surface) of mill end pin 75 of tubular member 72. This integral geometry provides a single leak-tight, metal-to-metal, internal pressure seal. The mill end and field end seal angles relative to longitudinal axis 76 of the tubular members 71 and 72 can vary from 2° to 35° with a preferred range of 12° to 16°.

Figure 8C:
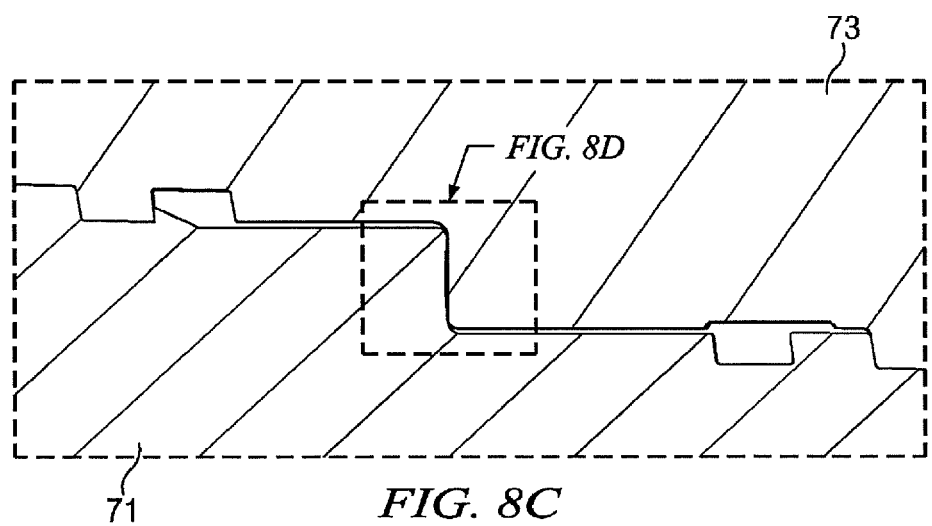
FIG. 8C is a schematic drawing in section of the second detailed area of FIG. 8A illustrating one embodiment of the present invention showing a torque shoulder situated along the thread path of a tubular member, with a detail of the torque shoulder labeled FIG. 8D.
Figure 8D:
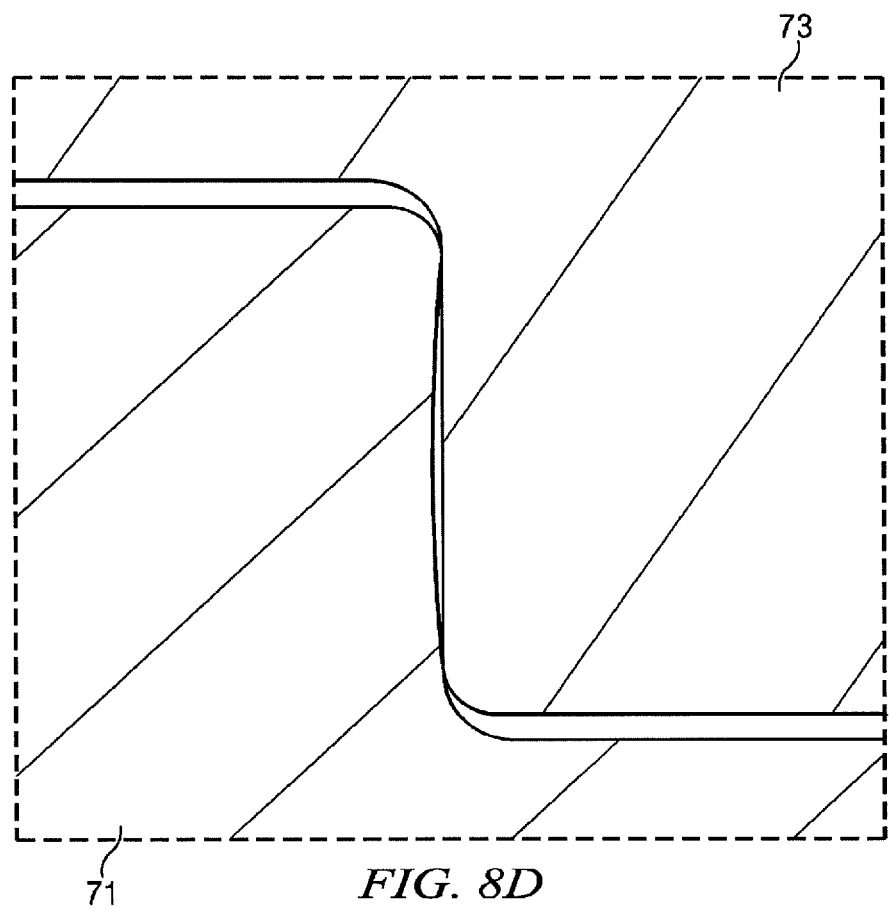
FIG. 8D is a schematic drawing in section showing a detail of the torque shoulder shown in FIG. 8C.

FIG. 7 shows an embodiment of the present invention wherein torque shoulders 89 and 90 create two radially and axially separate thread profiles on tubular members 71 and 72 on coupling 73. The thread profiles, while separated, remain in lead and the pitch diameter of the threads is controlled relative to the torque shoulders. Torque shoulders 89 and 90 are formed where steps along the thread profiles of tubular members 71 and 72 are in opposition with corresponding steps along the thread profile of coupling 73. The torque shoulder surfaces of tubular members 71 and 72 have faces that are slightly concave relative to center plane 77. The concave surface is created by two opposing angles ranging of from 0 degrees to 5 degrees off a perpendicular plane relative to longitudinal axis 76, with the preferred angles being 2 degrees to 3 degrees. The torque shoulder surfaces of coupling 73 have faces that are flat and also perpendicular to longitudinal axis 76. The relationship between the torque shoulder surface of tubular member 71 and the opposing torque shoulder surface of coupling 73 are shown in FIGS. 8C and 8D. The shape of the torque shoulder is designed to cause a more uniform distribution of forces on the shoulder that result from the torque associated with assembly of the connection and applied compressive stresses.

For proper performance of the integral seal geometry of this embodiment, as shown in detail in FIG. 8B, clearance is required between the outer diameter of the mill end pin 75 at the lip 86 and the inner diameter of coupling 73. This clearance or seal gap 84 must be in the range of 0.000 inches to 0.008 inches, with a typical gap being 0.003 inches. The gap is required to provide radial support to the mill end seal geometry by the coupling at its thickest section. Interference between the mill end pin outer diameter surface and the coupling bore inner diameter can be allowed to occur and can vary between 0.0000 inch to 0.0005 inch per inch of diameter of the second pin end at the lip. The coupling also can have a minimally tapered contact surface so that interference occurs on only the mill end of the tubular member. This interference allows coupling support of the mill end seal surface at the lip when pressure is applied to the connection during assembly. During assembly, the male sealing surface is pushed down (deflected toward longitudinal axis 76) and the female sealing surface is pushed out (deflected away from the longitudinal axis 76). Thus, during assembly the two pin ends interfere with each other's positioning, hence the term interference. To create contact pressure between the male and females sealing surfaces, the seals are designed so that the male sealing surface is larger in diameter than the female sealing surface, but the diameter reference point is the same length on both the male and female parts from a common point on a torque shoulder. When contact is made with a respective torque shoulder, the male and female sealing surfaces are in interference positionally with each other. This interference is created by radial displacement as a result of controlled positioning of the male and female pin ends during assembly of the coupled connection. The male and female sealing surfaces require a controlled radial metal-to-metal interference of between 0.001 inch per inch of seal diameter to 0.004 inch per inch of seal diameter.

Figure 9:
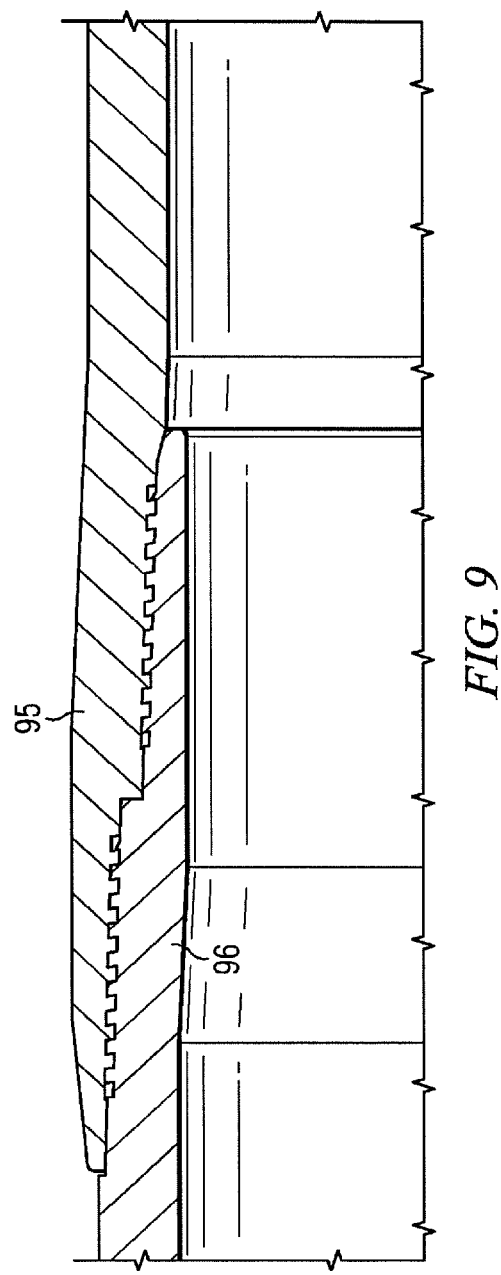
FIG. 9 is a schematic drawing in section with portions broken away showing a female box connection formed on the mill end of a first tubular member connected directly to a male pin formed on the field end of a second tubular member according to the teachings of one embodiment of the present invention.

In another embodiment of the present invention shown in FIG. 9, an internal, cold-formed female threadform (box connection) 95 is machined on the mill end of a tubular member, while an external male threadform (pin) is machined on the opposite field end of the same tubular member, as exemplified by 96. Each end of the tubular member would possess an integral geometry required to generate the interference necessary to produce a single, metal-to-metal, contact seal when connected to a tubular member having similarly machined ends. This particular integral seal geometry is achieved by machining a conical box end seal surface into a cold-formed expanded end of a tubular member, and machining a conical pin end seal surface at the other end of the same tubular member. This provides a box connection formed from a single tubular member, thus eliminating the need for a separate coupling.

Each end of the tubular member also possesses a torque shoulder that divides the respective threadform into two radially and axially separated thread profiles. The torque shoulder of the pin end has a face that is slightly concave relative to the terminus of the pin end, while the torque shoulder of the box end has a flat face that is perpendicular relative to the longitudinal axis of the tubular member and facing the terminus of the box end. Thus, when two identical tubular members are connected to each other, the torque shoulder of the pin end of one tubular member is in opposition to the torque shoulder of the box end of the connecting tubular member. In addition, the box end is beveled and has an outer diameter formed by expanding the box end of the tubular member outward to create a new box end outer diameter that is no greater than 6.5% of the outer diameter of the tubular member, while the pin end is swaged down approximately 2% to 6.5% of the outer diameter of the tubular member at its smallest diameter.

Although the present invention and its advantages have been described in detail, it should be understood that various changes, substitutions and alternations can be made herein without departing from the spirit and scope of the invention.

What is claimed is:

1. A threaded connection for releasably coupling and sealing tubular members, the connection comprising:
   a tubular coupling having a first box end and a second box end, wherein a longitudinal bore extends through the coupling from the first box end to the second box end, with a center plane disposed proximate the middle of the coupling;
   a first internal thread profile at the first box end of the coupling, wherein the first internal thread profile has a torque shoulder that divides the first internal thread profile into two radially and axially separate thread profiles, with the torque shoulder having a flat face perpendicular to the longitudinal bore of the coupling and facing the terminus of the first box end;
   a second internal thread profile at the second box end of the coupling, wherein the second internal thread profile has a torque shoulder that divides the second internal thread profile into two radially and axially separate thread profiles, with the torque shoulder having a flat face perpendicular to the longitudinal bore of the coupling and facing the terminus of the second box end;
   a first tubular member having a longitudinal bore extending therethrough, wherein the first tubular member has a first pin end;
   a second tubular member having a longitudinal bore, wherein the second tubular member has a second pin end;
   a first external thread profile at the first pin end of the first tubular member, wherein the first external thread profile has a torque shoulder that divides the first external thread profile into two radially and axially separate thread profiles, with the torque shoulder having a concave face relative to terminus of the first pin end of the first tubular member;
   a second external thread profile at the second pin end of the second tubular member, wherein the second external thread profile has a torque shoulder that divides the second external thread profile into two radially and axially separate thread profiles, with the torque shoulder having a concave face relative to the terminus of the second pin end of the second tubular member;

a conical surface at the terminus of the first pin end of the first tubular member, wherein the conical surface has an angled primary seal surface relative to the longitudinal bore of the first tubular member; and, a lip at the terminus of the second pin end of the second tubular member, wherein the lip is designed to engagingly mate with the conical surface of the first tubular member when the first tubular member and the second tubular member are connected by the coupling, with the lip having an angle slightly greater than the angle of the primary seal surface relative to the longitudinal bore of the second tubular member.

2. A threaded connection according to claim 1, wherein the coupling has an outer diameter no greater than 6.5% of the outer diameter of either tubular member.

3. A threaded connection according to claim 1, wherein the coupling has a beveled first box end and a beveled second box end.

4. A threaded connection according to claim 1, wherein the thread form is a modified buttress thread having negative load flanks angled within in a range of −3 degrees and −10 degrees and positive stab flanks angled within a range of +10 degrees and +20 degrees, the load and flank angles being measured counterclockwise relative to an axis perpendicular to the axis of the longitudinal bore of the tubular members when connected.

5. A threaded connection according to claim 1, wherein a pitch of the threads ranges from 3 threads to 8 threads per inch of tubular member length.

6. A threaded connection according to claim 1, wherein the angle of the primary seal surface ranges from 2 degrees to 35 degrees relative to the longitudinal bore of the tubular members when connected by the coupling.

* * * * *